United States Patent
Chen et al.

(10) Patent No.: US 9,941,699 B2
(45) Date of Patent: Apr. 10, 2018

(54) SYSTEMS, METHODS AND APPARATUS FOR IMPROVED MANAGEMENT AND CONTROL OF ENERGY DELIVERY SYSTEMS

(71) Applicant: Siemens Industry, Inc., Alpharetta, GA (US)

(72) Inventors: Dingguo Chen, Eden Prairie, MN (US); Michael E. York, Rogers, MN (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 372 days.

(21) Appl. No.: 14/666,440

(22) Filed: Mar. 24, 2015

(65) Prior Publication Data

US 2016/0149408 A1   May 26, 2016

Related U.S. Application Data

(60) Provisional application No. 62/082,804, filed on Nov. 21, 2014.

(51) Int. Cl.
    *G05B 15/02* (2006.01)
    *H02J 3/00* (2006.01)
    *H02J 3/38* (2006.01)

(52) U.S. Cl.
    CPC ......... *H02J 3/381* (2013.01); *H02J 2003/007* (2013.01); *Y02E 60/76* (2013.01); *Y04S 40/22* (2013.01)

(58) Field of Classification Search
    CPC .... G05B 15/02; H02J 2003/007; H02J 3/005; H02J 3/381

USPC .................................................. 700/286, 296
See application file for complete search history.

(56) References Cited

U.S. PATENT DOCUMENTS

| | | | | |
|---|---|---|---|---|
| 4,305,129 | A |  12/1981 | Yannone et al. | |
| 7,373,221 | B2* | 5/2008 | Lal | H02J 3/00 236/47 |
| 7,454,270 | B2* | 11/2008 | Mansingh | G06Q 50/06 700/291 |
| 7,489,990 | B2* | 2/2009 | Fehr | G06Q 10/04 700/286 |
| 2004/0260430 | A1* | 12/2004 | Mansingh | G06Q 50/06 700/286 |
| 2004/0260489 | A1* | 12/2004 | Mansingh | G06Q 50/06 702/60 |
| 2008/0004721 | A1* | 1/2008 | Huff | G06Q 10/04 700/48 |

(Continued)

FOREIGN PATENT DOCUMENTS

CN       103595046 A    2/2014

*Primary Examiner* — Chun Cao (57) ABSTRACT

Embodiments provide systems, methods and apparatus for controlling an energy delivery system including providing an energy management system (EMS) having an automatic generation control (AGC) system including a load frequency control (LFC) module; executing two or more performance standard functions implemented within the LFC module using input data regarding the energy delivery system, wherein at least one of the performance standard functions is defined to be dependent upon another of the performance standard functions; and implementing corrections to the operation of the energy delivery system based upon solution results of executing the performance standard functions. Numerous other aspects are provided.

20 Claims, 4 Drawing Sheets

(56) References Cited

U.S. PATENT DOCUMENTS

2014/0354234 A1\* 12/2014 Sudan ..................... H02J 7/34
320/127

\* cited by examiner

SYSTEMS, METHODS AND APPARATUS FOR IMPROVED MANAGEMENT AND CONTROL OF ENERGY DELIVERY SYSTEMS

RELATED APPLICATIONS

The present application claims priority to U.S. Provisional Application No. 62/082,804 titled "Coordinated CPS Control" filed Nov. 21, 2014, which is incorporated herein by reference for all purposes.

FIELD

The present invention relates to operating energy delivery systems, and more specifically to improved management and control of such systems.

BACKGROUND

An energy management system (EMS) is a system of computer implemented tools used by operators of electric utility grids to monitor, control, and optimize the performance of the generation and/or transmission of an energy delivery system. In other words, an EMS optimizes, supervises and controls the transmission grid and generation assets. The monitoring and control functions are known as "supervisory control and data acquisition" (SCADA). Primary frequency control involves autonomous automatic actions by the EMS to arrest deviations in power system frequency whenever imbalances arise between load and generation. Primary frequency control actions are fast; they are measured in megawatt (MW)/seconds. Primary frequency control actions include governor response, load damping, and voluntary frequency-responsive load control, all of which contribute to frequency response. Secondary frequency control involves centrally coordinated actions by the EMS to return frequency to its scheduled value. Secondary frequency control actions are slower than primary frequency control actions; they are measured in MW/min. They are deployed both during normal operations and after primary frequency control resources have arrested frequency following major disturbances. Secondary frequency control actions include generation (or load) that responds to automatic generation control (AGC) signals or to operator dispatch commands. AGC is often referred to as "regulation" service.

In 2007, the Federal Energy Regulatory Commission (FERC) made compliance with the North American Electric Reliability Corporation's (NERC) reliability standards, which include control performance standard 001 (CPS1) and control performance standard 002 (CPS2) mandatory on registered entities pursuant to the new authorities for reliability, which had been given to the FERC by the United States Congress through the Energy Policy Act of 2005. Thus, Independent System Operators (ISOs) of electrical power networks are required to monitor and operate within certain power generation performance standards.

Beyond the CPS standards, the industry recognized that, from the standpoint of improving reliability, there are benefits to monitoring frequency error in time frames of less than one minute. This meant that practices which focus on managing area control error (ACE) and frequency over time frames of longer than one minute, would not, by themselves, be effective in ensuring reliability. For example, CPS1 does not provide strong incentives for short-term control because it is based on performance averaged over the course of an entire year. Since CPS1 was not intended to serve this purpose, the industry has developed the balancing authority ACE limit (BAAL) to address ACE and frequency excursions of shorter duration, as a supplement to CPS1. BAAL seeks to address all significant ACE and frequency deviations accounting for ACE diversity.

These performance standards determine the amount of imbalance that is permissible for reliability on power networks. Currently, ISOs operate by reacting to power trends as well as scheduled power interchange. Typically, operators provide regulatory agencies with schedule information detailing the quantity of energy and the time that energy will be produced. These schedules of energy vary over the course of a year, month, week, day, hour and other intervals of time such as seasons and special days such as holidays and weekends. Despite knowing that such energy requirements vary considerably at times, operators are often tasked with the burden of meeting demand for real-time and unanticipated shortage in energy. Having to meet these unanticipated demands is often the cause of increased energy costs. Under certain circumstances, energy costs may decrease when an oversupply of energy exists in the marketplace.

Thus, there is a significant need to comply with the control performance standards (CPS) (e.g., CPS1, CPS2, and BAAL) set by regulatory authorities such as the NERC. Therefore, what is needed are systems, methods and apparatus for improved management and control of energy delivery systems.

SUMMARY

In some embodiments, a method of controlling an energy delivery system is provided. The method includes providing an energy management system (EMS) having an automatic generation control (AGC) system including a load frequency control (LFC) module; executing two or more performance standard functions implemented within the LFC module using input data regarding the energy delivery system, wherein at least one of the performance standard functions is defined to be dependent upon another of the performance standard functions; and implementing corrections to the operation of the energy delivery system based upon solution results of executing the performance standard functions.

In other embodiments, an energy management system (EMS) is provided. The EMS includes a process controller; and a memory coupled to the process controller and storing instructions executable on the process controller, the instructions operable to execute two or more performance standard functions implemented within an LFC module using input data regarding an energy delivery system, wherein at least one of the performance standard functions is defined to be dependent upon another of the performance standard functions; and implement corrections to the operation of the energy delivery system based upon solution results of executing the performance standard functions.

In still other embodiments, a load frequency control (LFC) module within an automatic generation control (AGC) system is provided. The LFC module includes a LFC application operative to execute on a process controller to generate an output data structure and to store solution results in an operational database of a EMS; and a coordinated CPS control engine operable to execute on the process controller to receive input data, execute two or more performance standard functions called by the LFC application, and to populate the output data structure with solution results. At least one of the performance standard functions executable by the coordinated CPS control engine is defined to be dependent upon another of the performance standard functions.

Numerous other aspects are provided in accordance with these and other aspects of the invention. Other features and aspects of the present invention will become more fully apparent from the following detailed description, the appended claims and the accompanying drawings.

DESCRIPTION

Embodiments of the present invention provide systems, apparatus and methods for an improved energy management system (EMS) for electricity delivery, or more generally, energy delivery systems. Embodiments of the present invention include software applications and systems adapted to provide an enhanced automatic generation control (AGC) system via improvements to a load frequency control (LFC) module. The LFC module improvements include coordinating a CPS based control function and a predictive CPS control function. These improvements are responsible for determining the appropriate amount of system regulation required for regulating area frequency and interchange so that a control area's performance meets the NERC control performance standards.

Embodiments of the invention provide systems that operate using the overall twelve month CPS1 performance statistics and the overall monthly CPS2 performance statistics to meet NERC Control Performance Standard (CPS) requirements, for example where both the CPS1 performance requirement and the CPS2 performance requirement are enforced. In other embodiments, systems are provided that operate using the overall twelve month CPS1 performance statistics to meet the NERC CPS1 performance requirement and the control area's clock-minute average of reporting ACE does not exceed its clock-minute Balancing Authority ACE Limit (BAAL) for more than thirty consecutive clock minutes.

In some embodiments, the improved LFC module supports a new approach of computing control actions. For example, a control area's control action can be determined based on several factors such as the overall running CPS1 performance statistics over the past eleven months and the current month until the current time; the instantaneous CPS1 performance statistics for the current clock minute; the overall running CPS2 performance statistics over the current month till the current time; the instantaneous CPS2 performance statistics for the current clock ten minute time period; and/or the number of consecutive clock minutes for which clock-minute ACE average exceeds the control area's BAAL limit (e.g., depending on whether CPS2 is applicable or the BAAL limit is applicable).

Further, in the case where both CPS1 and CPS2 requirements are applicable, the long-term CPS1 control and CPS2 control and short-term-term CPS1 control and CPS2 control are integrated instead of being independent. The long-term CPS1 control and CPS2 control no longer directly impose control actions. The short-term CPS1 control and CPS2 control take guidance from the long-term CPS1 control and CPS2 control. The clock-minute ACE target from the long-term CPS1 control and the clock-ten-minute ACE target from the long-term CPS2 control ensure that if there are control actions required, they are significant factors to consider in determining to where the ACE should be driven down. In the case where the CPS1 requirement and the BAAL limit are applicable, the short-term CPS1 control and the long-term CPS1 control are applicable; and in addition, instead of CPS2 control, the ACE correction with respect to the BAAL limit is applied. In some embodiments, the control area's corrective control action is progressive, but can be aggressive depending on how good or bad the overall running control performance statistics are relative to the control area's specified performances targets and the NERC control performance requirements.

Figure 1:
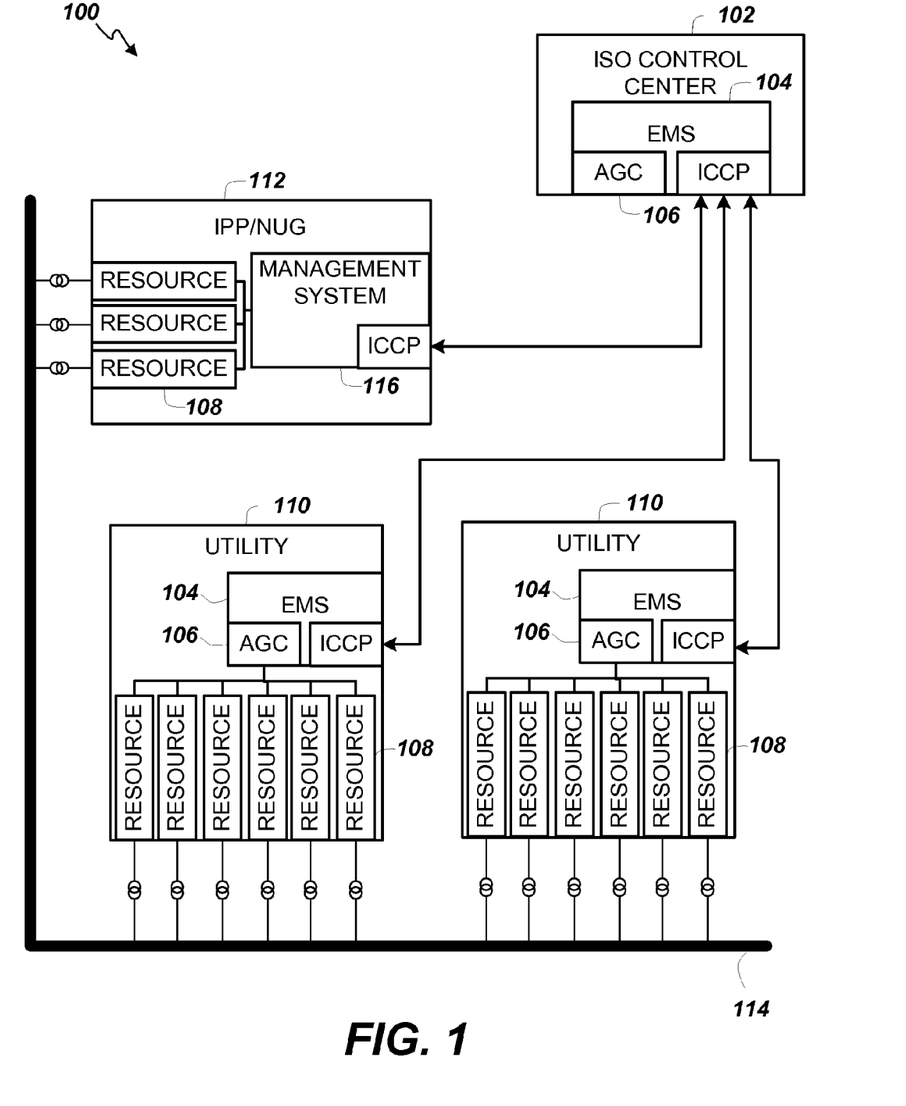
FIG. 1 is a block diagram depicting a portion of an example energy delivery system according to embodiments of the present invention.

Turning now to FIG. 1, a portion of an example energy deliver system 100 according to embodiments of the present invention is provided. Independent System Operators (ISO) 102 operate control centers that can include an EMS 104. The EMS 104 can include a number of hardware and software components for monitoring, controlling, and optimizing the performance (e.g., in terms of minimizing cost, maximizing efficiency, and maximizing reliability) of the generation and transmission of the energy delivery system 100.

The EMS 104 includes an automatic generation control (AGC) system 106 for adjusting the power output of multiple resources 108 (e.g., generators) at different power plants (e.g., utilities 110, independent power producers (IPP) and/or non-utility generators (NUG) 112, etc.), in response to changes in the load created by consumers of the electricity. The generated power is delivered from the resources 108 to consumers via transmission lines 114. Note that the utilities 110 can include an EMS 104 with an AGC system 106. IPPs and/or NUGs 112 can allow the ISO's AGC system 106 to control the IPPs' and/or NUGs' resources 108 but will include at least some form of management system 116.

Since a power grid requires that generation and load closely balance moment by moment, frequent adjustments to the output of resources 108 are continuously made. The balance can be judged by measuring the system frequency; if system frequency is increasing, more power is being generated than used, and the generators in the system 100 are accelerating. If the system frequency is decreasing, more load is on the system 100 than the instantaneous generation can provide, and the generators in the system 100 are slowing down.

Where the grid has tie interconnections to adjacent control areas, the AGC system 106 helps maintain the power interchanges over the tie lines at the scheduled levels. With computer-based control systems and multiple inputs, an AGC system 106 can take into account such matters as the most economical units to adjust, the coordination of thermal, hydroelectric, and other generation types, and constraints related to the stability of the system and capacity of interconnections to other power grids.

As indicated above, power utilities 110 and ISOs 102 are committed to controlling the generating resources 108 in their control areas in various optimized ways in order to meet the NERC mandated CPS1 performance requirement and either the CPS2 control performance requirement or the BAAL compliance requirement. In embodiments of the present invention, the running CPS1 performance statistics and either the CPS2 performance statistics or the running BAAL performance statistics are fed back into the control mechanism (e.g., the EMS 104) to ensure that at the end of each twelve month time period the overall yearly control performance statistics are satisfactory and either monthly CPS2 performance or the BAAL compliance performance is satisfactory.

Note that currently, some power utilities are using the CPS1 performance requirement with the BAAL requirement while others are applying the CPS1 performance requirement and the CPS2 performance requirement. It is anticipated that it may be several years for use of the BAAL requirement to entirely replace use of the CPS2 performance requirement. Thus, embodiments of the present invention include embodiments for meeting the CPS1 and CPS2 performance requirements, and embodiments for meeting the CPS1 and BAAL performance requirements. Note that use of the CPS1 is common to all embodiments.

Within the AGC systems of existing commercially available EMS products such as the Spectrum Power 3™ and the Spectrum Power TG™ Energy Management Systems manufactured by Siemens Industry, Inc. of Washington, D.C., load frequency control (LFC) modules can be included that provide CPS based control and predictive CPS control. However, existing CPS based control is short term based and only incorporates the current instantaneous CPS1 performance and the CPS2 performance into the AGC system control. Existing predictive CPS control is long term based. It only considers the running CPS1 performance and the CPS2 performance to a limited degree (that is, 11 months in the past and the current month until the current moment for CPS1, and the current month till the current moment for CPS2) and incorporates them into the AGC system control. These two controls execute independently and are not affected by each other. In other words, the output of the CPS based control does not influence the output of the predictive CPS control and vice versa. There can be disadvantages of these two controls operating independently of each other.

For the short term based CPS control, the prior art control only reacts to the current instantaneous CPS performance statistics: if the performance statistics are good enough, looser control is exercised; otherwise, tighter control is exercised. The prior art control does not consider how the current instantaneous CPS performance statistics should affect the overall CPS performance statistics. In the end, the overall performance statistics may be too good which means excessively tight control has been exercised (e.g., incurring unnecessary extra expense); or the overall performance statistics may not be good enough which means that opportunities have been lost when tighter control should have been exercised.

For the long term based CPS control, the control is aware of what the overall CPS1 and CPS2 performance statistics are and the control reacts to them. The control is not as responsive as the short term based CPS control. There are scenarios that require immediate corrections (e.g., ACE is consistently beyond a certain threshold for some time) so the situation does not get worse or even out of control.

In embodiments of the present invention, the short term based CPS control function and long term based CPS control function are coordinated and operate together to achieve the desired overall CPS performance levels and yet respond properly to instantaneous CPS performance statistics in a smooth manner (e.g., without taking unnecessary corrective actions).

In some embodiments, the LFC module is a cyclical executing program with a generation control cycle time of a few seconds (e.g., 2 seconds, 4 seconds, 6 seconds). The LFC module is operative to have the long term based CPS control function compute the one-minute ACE target and ten-minute ACE target; and to have the short term based CPS control function make use of these ACE targets and to calculate system MW control corrections for CPS1 and CPS2 and the total corrections required.

In the case where the BAAL performance standard is applied in place of the CPS2 performance standard, the BAAL control scheme is develop to calculate clock-minute ACE and clock-minute BAAL, monitor the clock-minute ACE average, and initiate control action to correct ACE back with the clock-minute BAAL if it exceeds clock-minute BAAL.

Figure 2:
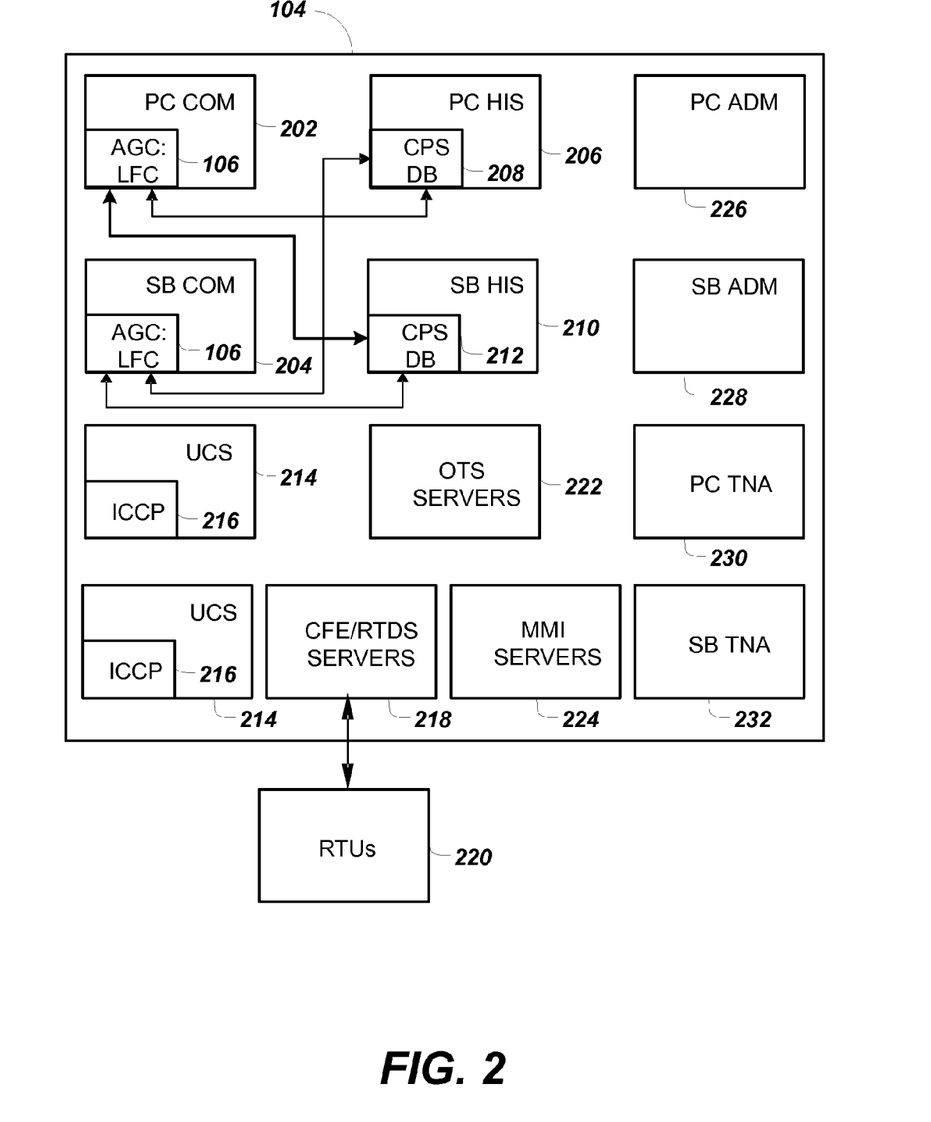
FIG. 2 is a block diagram of details of an example energy management system according to embodiments of the present invention.

Turning now to FIG. 2, an example configuration of an EMS 104 (e.g., an EMS 104 operated by an ISO) that supports operation of an improved AGC system 106 according to embodiments of the present invention is shown. The AGC system 106 includes a Load Frequency Control (LFC) module that implements a coordinated CPS control engine, the functions of which are described in detail below. The AGC system 106 can be implemented within a Process Controller (PC) server 202 that also includes Communicator (COM) functionality. The EMS 104 can include redundant back-up servers to provide higher reliability and fault-tolerance. Thus, a Standby (SB) server 204 is also provided. A PC server 206 that implements a Historical Information System (HIS) includes a CPS database (DB) 208 that is accessible by (e.g., communicatively coupled to) the LFC module in the AGC system 106. A SB server 210 implements a backup HIS that includes a backup CPS DB 212. The LFC module in the AGC system 106 is also adapted to access the backup CPS DB 212 of the SB server 210. Likewise, the LFC module of the backup AGC system 106 on the SB server 204 is adapted to access (e.g., is communicatively coupled to) both the CPS DB 208 of the PC server 206 with the HIS and the SB server 210 with the backup HIS that includes a backup CPS DB 212.

EMS 104 further includes one or more Utility Communication Servers 214 that each provide an implementation of an Inter-Control Center Communication Protocol (ICCP) 216 that enables communication with, for example, other EMSs in operation at, for example, several utilities 110 (FIG. 1). In some embodiments, ICCP 216 can be used to implement remote control of resources 108 (FIG. 1) by implementing AGC system 106 communications between different EMSs. The EMS 104 also includes a communication front end (CFE)/Real Time Data Server (RTDS) 218 to facilitate communications with external entities and users via remote terminal units (RTUs) 220. Note that RTUs 220 are part of the power utilities' field devices, for example.

In operation, the ISO clears the real time market through its market optimization engine and then the ISO dispatches instructions along with ancillary service awards (e.g., regulation, reserves, etc.) to individual power utilities through a transport mechanism (e.g., ICCP 216). The power utilities receive the dispatch instructions (e.g., via ICCP 216) and then make use of their AGC 106 to compute a power setpoint command for each AGC cycle for the resources under AGC control (i.e., AGC units). Next, the setpoints are updated to SCADA and they are then sent to the utilities' RTUs 220 via the CFE/RTDS 218. There are dedicated RTU lines that connect the RTUs to the CFE/RTDS 218 via, e.g., modems. Typically, RTUs are geographically located in the utilities' substations and hardwired to the resources (e.g., generators). The various applications such as, for example, AGC 106, SCADA, CFE/RTDS 218, and ICCP 216 are part of EMS 104. The RTUs 220 are field devices that are capable of sending telemetry to ISO EMS 104 and can also receive megawatt (MW) setpoints from the ISO EMS 104 to control resources (e.g., generators).

In some embodiments, the EMS 104 can include a number of additional servers and applications. For example, the EMS 104 can include Operator Training Simulator (OTS) servers 222, Man-Machine Interface (MMI) servers 224, a PC Administration (ADM) application server 226, a SB ADM application server 228, a PC Transmission Network Application (TNA) 230, and a SB TNA 232.

In some embodiments, the functions of the LFC module can include a Long Term CPS1 Control function, a Short Term CPS1 Control function, a Long Term CPS2 Control function, a Short Term CPS2 Control function, a BAAL Control function, a Prioritization of CPS1 and CPS2 Control function, and a Prioritization of CPS1 and BAAL Control function.

The Long Term CPS1 Control function makes use of the overall CPS1 performance statistics over the past eleven months and the current month until the current moment and employs probability theory to determine the one-minute ACE target for short term CPS1 control.

The Short Term CPS1 Control function incorporates the one-minute ACE target derived from the Long Term CPS1 Control function and determines the control effort needed to achieve CPS1 control.

According to embodiments of the present invention, along with the Long Term CPS1 Control function and the Short Term CPS1 Control function, either the two CPS2 control functions can be used or the BAAL Control function can be used.

The Long Term CPS2 Control function makes use of the overall CPS2 performance statistics over the current month till the current moment and employs probability theory to determine the ten-minute ACE target for short term CPS2 control.

The Short Term CPS2 Control function incorporates the ten-minute ACE target derived from the Long Term CPS1 Control function and determines the control effort needed to achieve CPS2 control.

The BAAL Control function incorporates the safer BAAL target, which is more conservative than the BAAL high limit or low limit, and employs the safer BAAL target to determine the control effort needed to achieve BAAL control.

The Prioritization of CPS1 and CPS2 Control function operates according to a rule set based on the relative status of the CPS corrections. If the CPS1 correction and the CPS2 correction are in the same direction (e.g., both indicating generation frequency should be increased by adding generation/regulation or both indicating generation frequency should be decreased by reducing generation/regulation), the greater correction is used. If the CPS1 correction and the CPS2 correction are in the opposite directions, the CPS2 correction is used for control. If there is a CPS1 correction and no CPS2 correction, the CPS1 correction is used. If there is a CPS2 correction and no CPS1 correction, the CPS2 correction is used.

The Prioritization of CPS1 and BAAL Control function operates according to a rule set based on the relative status of the CPS1 and BAAL corrections. If the CPS1 correction and the BAAL correction are in the same direction, the greater correction is used. If the CPS1 correction and the BAAL correction are in the opposite directions, the BAAL correction is used for control. If there is a CPS1 correction and no BAAL correction, the CPS1 correction is used. If there is a BAAL correction and no CPS1 correction, the BAAL correction is used.

In order to achieve the objectives of economically dispatch generating units among economically dispatchable generating units and economically allocating regulation among regulating units and yet incur the only the minimum number of generating units movements (e.g., corrections), two sets of algorithmic procedures are provided by embodiments of the present invention and these procedures work together in a coordinated manner.

The functions of the LFC module listed above are now described in detail. The Long Term CPS1 Control function determines the ten-minute ACE target for the next clock ten-minute time period. NREC CPS1 standard is defined as:

$$AVG_{12\text{-month}}\left[\left(\frac{ACE_i}{-10B_i}\right)_i \Delta F_i\right] \leq \varepsilon_1^2$$

or equivalently, $$CPS1 = \left(2 - AVG_{12\text{-month}}\left[\left(\frac{ACE_i}{-10B_i}\right)_i \Delta F_i\right] \Big/ \varepsilon_1^2\right) \times 100\% \geq 100\%$$

where $AVG_i$=the 12 month average;
$ACE_i$=the clock-minute average of ACE;
$B_i$=the frequency bias of the control area;
$\varepsilon_i$ is the interconnections' targeted frequency bound; and
$\Delta F_i$ is the clock-minute average frequency error.

A 12-month time period T has ($n_T$=365 days/year×24 hours/day×60 1-minute intervals/hour) 525600 clock-minute time intervals. Let $n_t$ denote the number of clock-minute time intervals till now within the interesting 12-month time period T. Let $n_{T-t}$ designate the number of remaining clock-minute time intervals till the end of period T. Let $n_T$ designate the number of total clock-minute time intervals within the time period T. To simplify the derivation that follows, we define $$X = \left[\left(\frac{ACE_i}{-10B_i}\right)_i \Delta F_i\right]$$

Then CPS1 standard can be equivalently expressed in probability terms as $$\overline{X} = E\{X\} \leq \varepsilon_1^2$$

with the common-sense assumption that the expectation of X equals its time average over a sufficiently long time period.

Let the average of X during the $n_t$ clock-minute time period be denoted by $\overline{X}_1$, and let the average of X during the remaining $n_{T-t}$ clock-minute time period be denoted by $\overline{X}_2$. Then we have the following:

$$\overline{X} = \frac{n_t}{n_t + n_{T-t}} \overline{X}_1 + \frac{n_{T-t}}{n_t + n_{T-t}} \overline{X}_2 \leq \varepsilon_1^2$$

Notice that $n_T=n_t+n_{T-t}$, and $n_t$, $n_{T-t}$ and $n_T$ are all known, and $\overline{X}_1$ can be computed as $$AVG_{n_t Clock\text{-}MinuteTimeIntervals}\left[\left(\frac{ACE_i}{-10B_i}\right)_i \Delta F_i\right].$$

Therefore, $$\overline{X}_2 \leq [(n_t+n_{T-t})\varepsilon_1^2 - n_t\overline{X}_1]/n_{T-t}$$

where $\overline{X}_2$ presents statistical target for $$\left[\left(\frac{ACE_i}{-10B_i}\right)_i \Delta F_i\right]$$

for the remaining $n_{T-t}$ clock-minute time horizon. Note that this target can be lower or higher depending on the CPS1 performance until the current moment.

To further compute the CPS1 based control target, we require that for every clock-minute, $$\left[\left(\frac{ACE_i}{-10B_i}\right)_i \Delta F_i\right] \leq [(n_t+n_{T-t})\varepsilon_1^2 - n_t\overline{X}_1]/n_{T-t}.$$

If this is satisfied for every clock-minute for the remaining $n_{T-t}$ clock-minute time horizon, then we can achieve the desired performance $$\overline{X}_2 \leq [(n_t+n_{T-t})\varepsilon_1^2 - n_t\overline{X}_1]/n_{T-t}.$$

The previous clock-minute average frequency error $\Delta F_i$ can be used as the current clock-minute average frequency error in order to calculate the current clock-minute ACE target which in turns determines the eventual CPS1 based control amount. Consequently, $$\left[\left(\frac{ACE_i}{-10B_i}\right)_i \Delta F_i\right] \leq [(n_t+n_{T-t})\varepsilon_1^2 - n_t\overline{X}_1]/n_{T-t}$$

Therefore,
If $\Delta F_i>0$, then $$ACE_i \leq \{[(n_t+n_{T-t})\varepsilon_1^2 - n_t\overline{X}_1]/n_{T-t}\}(-10B_i)/\Delta F_i$$

If $\Delta F_i<0$, then $$ACE_i \geq \{[(n_t+n_{T-t})\varepsilon_1^2 - n_t\overline{X}_1]/n_{T-t}\}(-10B_i)/\Delta F_i$$

To be less aggressive, the largest clock-minute average frequency error $\Delta F_i$ (in absolute value), denoted by $$(\Delta F_i)_m = \max_i(\{|\Delta F_i|\})\text{sign}(\Delta F_i),$$

among the past larger time period (for instance, the previous 30-minute time period) can be used. In either case, the clock-minute ACE target is calculated as $$ACE_i = \{[(n_t+n_{T-t})\varepsilon_1^2 - n_t\overline{X}_1]/n_{T-t}\}(-10B_i)/(\Delta F_i)_m$$

$$\mu_1 = |A\{[(n_t+n_{T-t})\varepsilon_1^2 - n_t\overline{X}_1]/n_{T-t}\}(-10B_i)/(\Delta F_i)_m|$$

or $-\mu_1$ represents the clock-minute ACE target depending on the sign of the eventual clock-minute ACE average for the future clock minute. These clock-minute ACE targets are calculated every minute. Note that $\mu_1$ cannot be too large, if it is greater than $L_{10}$, then $\mu_1=L_{10}$.

Besides the CPS1 performance standard requirement of 100% compliance ($CPS1_{NERC}^{Target}=100\%$), each control area has its own CPS1 performance target $CPS1_{CA}^{Target}$ which must be higher than $CPS1_{NERC}^{Target}$. Let the overall running CPS1 performance over the past eleven months and current month until the current moment be denoted by $CPS1_{CA}^{Overall}$.

There is no long-term CPS1 control action if $CPS1_{CA}^{Overall}>CPS1_{CA}^{Target}$. For all other cases, the long-term CPS1 control action will be incorporated in the short-term CPS1 control action, which is detailed in the Short Term CPS1 Control function below.

The Long Term CPS2 Control function determines the one-minute ACE target for the next clock-minute time period. CPS1 and CPS2 performance indices are checked yearly or monthly and based on 1-minute or 10-minute average, i.e. time integral values of ACE. In prior art approaches, time weighting factors are used to accommodate control strategy to already processed and future expectations of ACE values.

A real-time control strategy can be based on solid foundations of probability theory. Embodiments of the present invention determine how to proceed with inter-temporal adjustments in the least statistically correct way. Note that the CPS based AGC is a fully statistical problem expressed in probability terms. In particular, NERC requires 90% compliance of 10-minute ACE averages over 1 month. The CPS2 standard can be defined as:

$$Avg_{10\text{-}minute}[ACE_i] \leq L_{10}$$

Where:
$ACE_i$ is the instantaneous tie-line bias ACE value $$L_{10}=L_{pr}\cdot\varepsilon_{10}\cdot\sqrt{(-10B_i)(-10B_s)}$$

$\varepsilon_{10}$ is the constant derived from the targeted frequency bound.
$L_{pr}$ is the constant equal to 1.65 used to convert the frequency target to 90% probability
$B_i$ is the frequency bias of the Control Area
$B_s$ is the frequency bias of the interconnection.

One month has (for example, in case of a 30-day month, 30 days×24 hours×6 10-minute intervals) T=4320 10-minute time intervals. Let the current time interval be denoted by t. Let until this time $n_t$ denote number of valid $ACE_{10\text{-}min}$ values and $v_t$ represent the number of them that are CPS2 violations. Let $n_{T-t}$ denote the number of remaining time intervals until the end of period T, and assume there will be $v_{T-t}$ CPS2 violations. To comply with the CPS2 standard with 90% at the end of T time intervals the following relation should be satisfied:

$$\frac{v_t+v_{T-t}}{n_t+n_{T-t}} \leq 0.1$$

or $$\frac{v_{T-t}}{n_{T-t}} \leq 0.1 + \frac{0.1\cdot n_t - v_t}{n_{T-t}} = p_{T-t}$$

where $P_{T-t}$ presents probability target for the remaining T−t time horizon. Note that this target can be lower or higher than 0.1 depending on performance until the moment t.

CPS2 criteria can be expressed in probability terms as:

$$P\{|[\overline{ACE_{10}}]| \leq L_{10}\}0.9$$

Where $[\overline{ACE_{10}}]$ is a random variable that represents 10-minute ACE average over 1 month.
Let $B_{10}=\varepsilon_{10}\sqrt{(-10B_i)(-10B_s)}$
Then $L_{10}=1.65B_{10}$ It is assumed in NERC's CPS criteria derivation that $[\overline{ACE_{10}}]$ has a normal distribution with its expectation 0 and standard deviation $\sigma_{[\overline{ACE_{10}}]}$ where $$\sigma_{[\overline{ACE_{10}}]}^2 = E\{[\overline{ACE_{10}}]^2\}$$

To simplify, normalize $[\overline{ACE_{10}}]$ such that $$ace_{10} = [\overline{ACE_{10}}]/\sigma_{[\overline{ACE_{10}}]}$$

Then $ace_{10}$ has a standard normal distribution with expectation 0 and standard deviation 1, and its probability density function is $$p(x) = \frac{1}{\sqrt{2\pi}} \exp\left\{-\frac{x^2}{2}\right\}$$

Now CPS2 criteria can be rewritten in terms of $ace_{10}$ as follows:

$$P\{|ace_{10}| \leq L_{10}/\sigma_{[\overline{ACE_{10}}]}\} \geq 0.9$$

Note that for any non-negative y, there exists a unique non-negative x such that $$P\{|ace_{10}| \leq x\} = \frac{1}{\sqrt{2\pi}} \int_{-x}^{x} \exp\left\{-\frac{t^2}{2}\right\} dt = y$$

Then if $$L_{10}/\sigma_{[\overline{ACE_{10}}]} \geq x,$$

we have $$P\{|ace_{10}| \leq x\} \geq y$$

Let y be a target for expected CPS2 compliance as calculated above, that is, $$y = p_{T-t} = 0.1 + \frac{0.1 \cdot n_t - v_t}{n_{T-t}},$$

the normalized $ace_{10}$ target x can be immediately computed (for example, when y=0.9, we have x=1.65).
With $$L_{10}/\sigma_{[\overline{ACE_{10}}]} \geq x,$$

we have $$\sigma_{[\overline{ACE_{10}}]} \leq L_{10}/x,$$

Since $\sigma_{[\overline{ACE_{10}}]}$ can be calculated using an average approach (approximation of expectation of $[\overline{ACE_{10}}]^2$), we can readily calculate the CPS2 ACE-10 control target for the next 10-minute period.

$$\left(\sum_{i=1}^{t-1} [\overline{ACE_{10}}]_i^2 + [\overline{ACE_{10}}]_t^2\right)/(t-1) = [\sigma_{[\overline{ACE_{10}}]}]^2$$

That is, from $$\sqrt{\left(\sum_{i=1}^{t-1} [\overline{ACE_{10}}]_i^2 + [\overline{ACE_{10}}]_t^2\right)/(t-1)} = L_{10}/x$$

We have $$|[\overline{ACE_{10}}]_t| = \sqrt{((t-1) \times (L_{10}/x)^2) - \sum_{i=1}^{t-1} [\overline{ACE_{10}}]_i^2}$$

$$\mu_{10} = \sqrt{((t-1) \times (L_{10}/x)^2) - \sum_{i=1}^{t-1} [\overline{ACE_{10}}]_i^2}$$

or $-\mu_{10}$ represents the clock-ten-minute ACE target depending on the sign of eventual clock-ten-minute ACE average for the future clock-ten-minute time period. These clock-ten-minute ACE targets are calculated every ten minutes. Note that $\mu_{10}$ cannot be too large, if it is greater than $L_{10}$, then $\mu_{10}=L_{10}$; if $\mu_{10}$ does not exist, then $\mu_{10}=L_{10}$.

Besides the CPS1 performance standard requirement of 90% compliance ($CPS2_{NERC}^{Target}=90\%$), each control area has its own CPS2 performance target $CPS2_{CA}^{Target}$ which must be higher than $CPS2_{NERC}^{Target}$. Let the overall running CPS2 performance over the current month till the current moment be denoted by $CPS2_{CA}^{Overall}$.

There is no long-term CPS2 control action if $CPS2_{CA}^{Overall} > CPS2_{CA}^{Target}$. For all other cases, the long-term CPS2 control action will be incorporated in the short-term CPS2 control action, which will be detailed in the Short Term CPS2 Control below.

The Short Term CPS1 Control function is next derived. The instantaneous CPS1 performance for the current LFC control cycle is calculated as follows:

$$CPS1_{CA}^{Instant} = \left(2 - \frac{\overline{ACE}}{-10\overline{B}} \Delta \overline{F}/\varepsilon_1^2\right) \times 100\%$$

Where $\overline{ACE}$ is the running average ACE for the current clock minute, $\overline{B}$ the running average frequency bias of the control area for the current clock minute, $\varepsilon_1$ the interconnection's targeted frequency bound, and $\Delta \overline{F}$ the running average frequency error for the current clock minute.

In some embodiments, the control scheme can be defined as follows. If the overall CPS1 performance is better than the CPS1 target, that is, $$CPS1_{CA}^{Overall} > CPS1_{CA}^{Target},$$

then the following three cases are differentiated: (A) If the instantaneous CPS1 performance is better than the NERC CPS1 performance requirement, that is, $CPS1_{CA}^{Instant} > CPS1_{NERC}^{Target}$, then there is no control action from Short-Term CPS1 Control. (B) If the instantaneous CPS1 performance is between the desired overall CPS1 performance target and the NERC CPS1 performance requirement, that is, $$CPS1_{NERC}^{Target} \leq CPS1_{CA}^{Instant} \leq CPS1_{CA}^{Target},$$

then the correction for CPS1 is CPS1_Correction=$-k_1$(ACE$-\mu_1$) for ACE>$\mu_1$, or CPS1_Correction=$-k_1$(ACE+$\mu_1$) for ACE<$-\mu_1$, or no control action for $-\mu_1$<ACE<$\mu_1$; where $k_1$ is positive and tunable with a default value of 0.2. (C) If the instantaneous CPS1 performance is less than the NERC CPS1 performance requirement, that is, $$CPS1_{CA}^{Instant} < CPS1_{NERC}^{Target},$$

then the correction for CPS1 is

CPS1_Correction=$-k_2$(ACE$-\mu_1$) for ACE>$\mu_1$, or

CPS1_Correction=$-k_2$(ACE+$\mu_1$)

for ACE<−$\mu_1$, or no control action for −$\mu_1$<ACE<$\mu_1$; where $k_2$ is positive and tunable with a default value of 0.5.

If the overall CPS1 performance is between the CPS1 target and the minimum NERC CPS1 performance requirement, that is, $$CPS1_{NERC}^{Target} < CPS1_{CA}^{Overall} < CPS1_{CA}^{Target},$$

then the following three cases are differentiated: (A) If the instantaneous CPS1 performance is better than the NERC CPS1 performance requirement, that is, $CPS1_{CA}^{Instant} > CPS1_{NERC}^{Target}$, then there is no control action from Short-Term CPS1 Control. (B) If the instantaneous CPS1 performance is between the desired overall CPS1 performance target and the NERC CPS1 performance requirement, that is, $CPS1_{NERC}^{Target} \leq CPS1_{CA}^{Instant} \leq CPS1_{CA}^{Target}$, then the correction for CPS1 is CPS1_Correction=−$k_3$(ACE−$\mu_1$) for ACE>$\mu_1$, or CPS1_Correction=−$k_3$(ACE+$\mu_1$) for ACE<−$\mu_1$, or no control action for −$\mu_1$<ACE<$\mu_1$; where $k_3$ is positive and tunable with a default value of 0.4. (C) If the instantaneous CPS1 performance is less than the NERC CPS1 performance requirement, that is, $CPS1_{CA}^{Instant} < CPS1_{NERC}^{Target}$, then the correction for CPS1 is CPS1_Correction=−$k_4$(ACE−$\mu_1$) for ACE>$\mu_1$, or CPS1_Correction=−$k_4$(ACE+$\mu_1$) for ACE<−$\mu_1$, or no control action for −$\mu_1$<ACE<$\mu_1$; where $k_4$ is positive and tunable with a default value of 0.6.

If the overall CPS1 performance is less than the minimum NERC CPS1 performance requirement, that is, $$CPS1_{CA}^{Overall} < CPS1_{NERC}^{Target},$$

then the following three cases are differentiated: (A) If the instantaneous CPS1 performance is better than the NERC CPS1 performance requirement, that is, $CPS1_{CA}^{Instant} > CPS1_{NERC}^{Target}$, then there is no control action from Short-Term CPS1 Control. (B) If the instantaneous CPS1 performance is between the desired overall CPS1 performance target and the NERC CPS1 performance requirement, that is, $CPS1_{NERC}^{Target} \leq CPS1_{CA}^{Instant} \leq CPS1_{CA}^{Target}$, then the correction for CPS1 is CPS1_Correction=−$k_5$(ACE−$\mu_1$) for ACE>$\mu_1$, or CPS1_Correction=−$k_5$(ACE+$\mu_1$) for ACE<−$\mu_1$, or no control action for −$\mu_1$<ACE<$\mu_1$; where $k_5$ is positive and tunable with a default value of 0.7. (C) If the instantaneous CPS1 performance is less than the NERC CPS1 performance requirement, that is, $CPS1_{CA}^{Instant} < CPS1_{NERC}^{Target}$, then the correction for CPS1 is CPS1_Correction=−$k_6$(ACE−$\mu_1$) for ACE>$\mu_1$, or CPS1_Correction=−$k_6$(ACE+$\mu_1$) for ACE<−$\mu_1$, or no control action for −$\mu_1$<ACE<$\mu_1$; where $k_6$ is positive and tunable with a default value of 1.0.

Note that if the instantaneous ACE and the instantaneous frequency deviation are in opposite directions, there is no need to take CPS1 correction. If the instantaneous ACE in magnitude is more than the pre-designated emergency threshold (which can typically be a few times as large as $L_{10}$), the corrective control action is to bring ACE to 0.

In the Short Term CPS2 Control function, the instantaneous CPS2 performance is measured to compare the current clock-ten-minute ACE average to $L_{10}$ and then a check is made to determine if the average is less than $L_{10}$. The instantaneous CPS2 performance for the current clock-ten-minute is either 0 or 100%. In some embodiments, the control scheme for this function can be defined as follows.

If the overall CPS2 performance is better than the CPS2 target, that is, $$CPS2_{CA}^{Overall} > CPS2_{CA}^{Target},$$

then the following two cases are differentiated: (A) If the instantaneous CPS2 performance is 100%, then there is no control action from Short-Term CPS2 Control. (B) If the instantaneous CPS2 performance is 0% (which means the absolute value of the current clock-ten-minute ACE average is greater than $L_{10}$), then the correction for CPS2 is $$CPS2\_Correction=-(ACE-k_7 \min(\mu_{10}, L_{10}-db))$$

if $$ACE > \min(\mu_{10}, L_{10}-db),$$

or $$CPS2\_Correction=-(ACE+k_7 \min(\mu_{10}, L_{10}-db))$$

if $$ACE < -\min(\mu_{10}, L_{10}-db),$$

where $k_7$ is positive and tunable with a default value of 1.0, and db is a deadband applied to $L_{10}$.

If the overall CPS2 performance is between the CPS2 target and the minimum NERC CPS2 requirement, that is, $$CPS2_{NERC}^{Target} < CPS2_{CA}^{Overall} < CPS2_{CA}^{Target},$$

then the following two cases are differentiated: (A) If the instantaneous CPS2 performance is 100%, then there is no control action from Short-Term CPS2 Control. (B) If the instantaneous CPS2 performance is 0% (which means the absolute value of the current clock-ten-minute ACE average is greater than $L_{10}$), then the correction for CPS2 is $$CPS2\_Correction=-(ACE-k_8 \min(\mu_{10}, L_{10}-db))$$

if $$ACE > \min(\mu_{10}, L_{10}-db),$$

or $$CPS2\_Correction=-(ACE+k_8 \min(\mu_{10}, L_{10}-db))$$

if $$ACE < -\min(\mu_{10}, L_{10}-db),$$

where $k_8$ is positive and tunable with a default value of 0.5.

If the overall CPS2 performance is less than the minimum NERC CPS2 requirement, that is, $$CPS2_{CA}^{Overall} < CPS2_{NERC}^{Target},$$

then the following two cases are differentiated: (A) If the instantaneous CPS2 performance is 100%, then there is no control action from Short-Term CPS2 Control. (B) If the instantaneous CPS2 performance is 0% (which means the absolute value of the current clock-ten-minute ACE average is greater than $L_{10}$), then the correction for CPS2 is $$CPS2\_Correction=-(ACE-k_9 \min(\mu_{10}, L_{10}-db))$$

if $$ACE > \min(\mu_{10}, L_{10}-db),$$

Or $$CPS2\_Correction=-(ACE+k_9 \min(\mu_{10}, L_{10}-db))$$

if $$ACE < -\min(\mu_{10}, L_{10}-db),$$

where $k_9$ is positive and tunable with a default value of 0.

The BAAL Control function computes running clock-minute average, the clock-minute BAAL, compares the clock-minute average to the clock-minute BAAL, and at the end of each clock minute, checks if there is BAAL violation. If so, then the count-down time for correcting the BAAL violation is 29 minutes (with 1 minute of BAAL violation already assessed). The monitoring and control involves the following process.

The clock-minute average ACE is computed. The instantaneous BAAL is computed as follows.

$$BAAL_{Low} = (-10B_i(FTL_{Low} - F_S)) \times \frac{(FTL_{Low} - F_S)}{F_A - F_S}$$

when actual frequency is less than scheduled frequency.

$$BAAL_{High} = (-10B_i(FTL_{High} - F_S)) \times \frac{(FTL_{High} - F_S)}{(F_A - F_S)}$$

when actual frequency is greater than scheduled frequency. Note that $BAAL_{Low}$ or $BAAL_{High}$ may apply, but not both. If actual frequency is equal to Scheduled Frequency, neither of $BAAL_{Low}$ and $BAAL_{High}$ applies.

The relevant variables are defined as follows. $BAAL_{Low}$ represents the Low Balancing Authority ACE Limit (MW). $BAAL_{High}$ represents the High Balancing Authority ACE Limit in MW. $B_i$ represents the Frequency Bias Setting for a Balancing Authority in MW/0.1 Hz. $F_A$ represents the measured frequency in Hz. $F_S$ represents the scheduled frequency in Hz. $FTL_{Low}$ represents the Low Frequency Trigger Limit (calculated as $F_S - 3\varepsilon_1$) in Hz. $FTL_{High}$ represents the High Frequency Trigger Limit (calculated as $F_S + 3\varepsilon_1$) in Hz. $\varepsilon_1$ represents the constant derived from a targeted frequency bound for each Interconnection (same as the constant used in the CPS1 calculations above).

The actual frequency trend is monitored. The necessary condition to apply BAAL control is that the actual frequency consistently stays above (or below) the scheduled frequency, and accordingly only $BAAL_{High}$ (or $BAAL_{Low}$) is applicable. Since the control objective is to bring the clock-minute ACE below $BAAL_{High}$ (or above $BAAL_{Low}$) within at most 30 minutes to avoid penalty, each control area may have its own time target which is less than 30 minutes for some safety margin to bring the clock-minute average ACE to comply with the applicable BAAL.

Let the time target be $T_{BAAL}$ ($T_{BAAL} < 30$) minutes. Let the number of minutes over which the clock-minute average violates the applicable BAAL (use BAAL instead of mentioning explicitly $BAAL_{High}$ or $BAAL_{Low}$) be denoted by $T_{BAAL}^{Past}$. Since over any of the remaining ($T_{BAAL} - T_{BAAL}^{Past}$) clock-minutes, if the control action is able to bring the clock-minute average ACE to comply with the BAAL, then the control area is BAAL compliant. Note that the BAAL control really reduces to single clock-minute average ACE correction irrespective of previous clock-minute ACE averages. This makes Proportional Control a natural choice to correct clock-minute ACE for BAAL compliance.

In some embodiments, the control scheme can be defined as follows. If $BAAL_{High}$ is violated, then the correction is $$BAAL\_Correction = -k_{11}\left(ACE - \frac{T_{BAAL} - T_{BAAL}^{Past}}{T_{BAAL}}(BAAL_{High} - db_{BAAL})\right)$$

where $k_{11}$ is positive and tunable with a default value of 1.0 and $db_{BAAL}$ is a positive deadband. Notice that as time progresses, the correction becomes more aggressive. If $BAAL_{Low}$ is violated, then the correction is $$BAAL\_Correction = -k_{12}\left(ACE - \frac{T_{BAAL} - T_{BAAL}^{Past}}{T_{BAAL}}(BAAL_{Low} - db_{BAAL})\right)$$

where $k_{12}$ is positive and tunable with a default value of 1.0.

The improved LFC module of embodiments of the present invention utilizes a real-time operational database for fast data I/O. The following data elements are used by the improved LFC module to implement coordinated CPS control. The data includes historical data from a Historical Information System (HIS) including ACE, frequency deviation, interchange error, frequency bias for the current month and past 12 months. That data also includes static data including constant values such as $\varepsilon_1$, $\varepsilon_{10}$, etc. The data further includes dynamic input data such as real-time measurements, calculated values, and user input data such as Current ACE, Current frequency, Frequency bias, Current net interchange, Net interchange schedule, Control area's CPS1 performance target, Control area's CPS2 performance target (applicable when CPS2 is used and not applicable when BAAL compliance is used). Other data types include working data that has been pre-processed by LFC to set up the formulation of the CPS based optimized control model and output data resulting from solving the optimized CPS control, i.e., the desired generation and system regulation.

In some embodiments, the improved LFC module can be implemented in two parts. The first part is an LFC application that does data pre-processing and prepares data in a form that can be accepted by the Coordinated CPS Control engine. The LFC application also obtains the solution results from the Coordinated CPS Control engine, performs post-processing, and stores the results into the operational database for implementation as regulation corrections. The second part is the Coordinated CPS Control Engine. This part includes the performance standards functions described in detail above and which are callable from within the LFC application. The Coordinated CPS Control Engine receives various input data, computes optimal CPS control solutions, and stores the solution results into the LFC application supplied output data structures.

Figure 3:
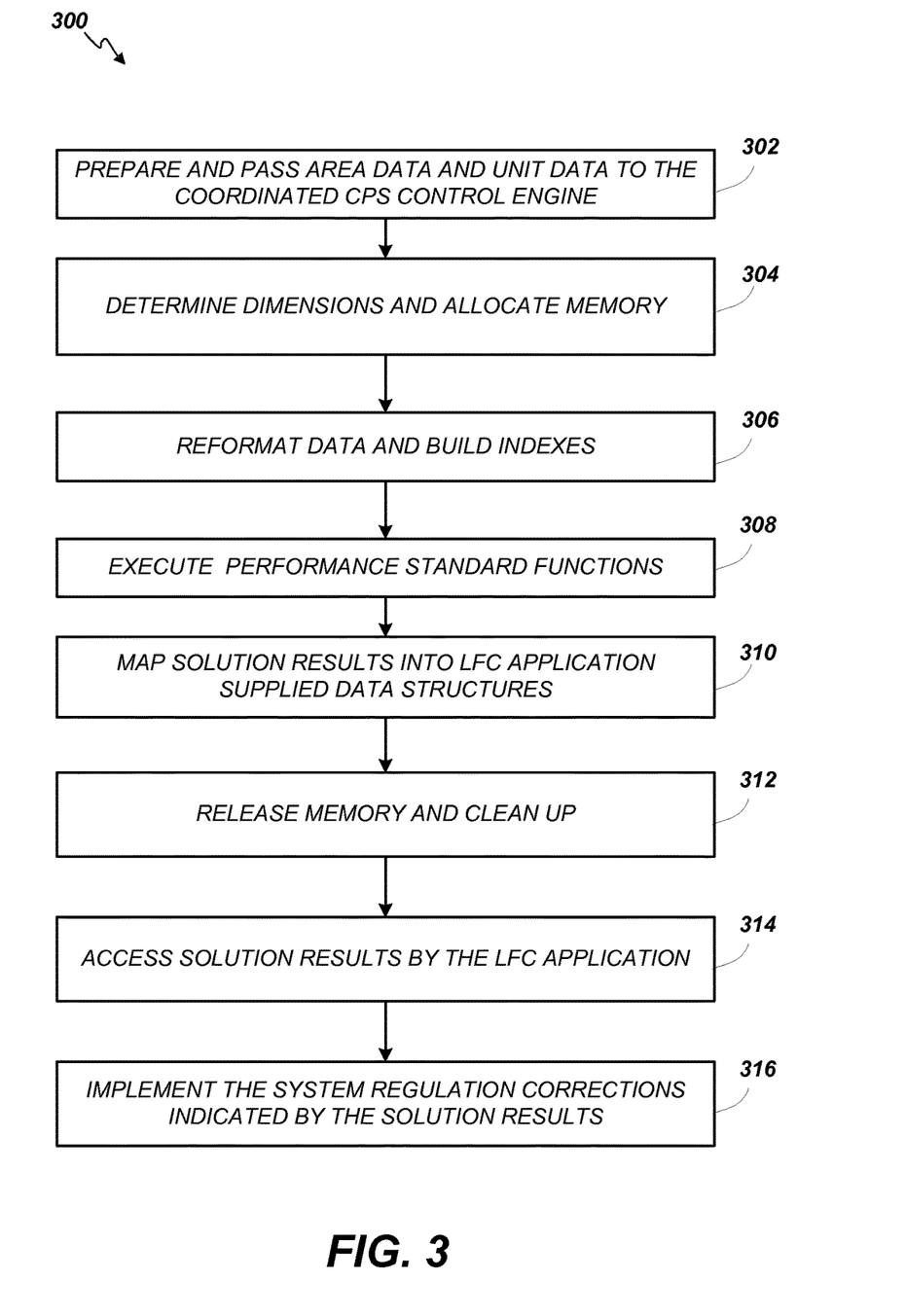
FIG. 3 is a flowchart depicting an example method according to embodiments of the present invention.

Turning now to FIG. 3, an example method 300 of controlling an energy delivery system according to embodiments of the invention is depicted in a flow chart. Within an AGC system of an EMS, an LFC module prepares and passes area data and unit data to a Coordinated CPS Control engine that implements the above described performance control functions (302). The data can be retrieved from the real-time CPS database and includes the historical, static, and dynamic input data described above. The Coordinated CPS Control engine determines and allocates the memory needed (304), and then reformats the data into useable arrangements and builds any needed indexes (306). Next, based on the performance standards being used, the appropriate performance standards functions within the Coordinated CPS Control engine are executed using the input data (308). The Coordinated CPS Control engine maps the resulting solution into output data structures provided by the LFC application (310). The Coordinated CPS Control engine releases the memory it used and cleans up (e.g., resets for subsequent executions) (312). The LFC Application accesses the solution results in the output data structures (314) and indicates the system regulation corrections to be made by the AGC based on the solution results, for example, by storing the solution results in the operational database (316).

Figure 4:
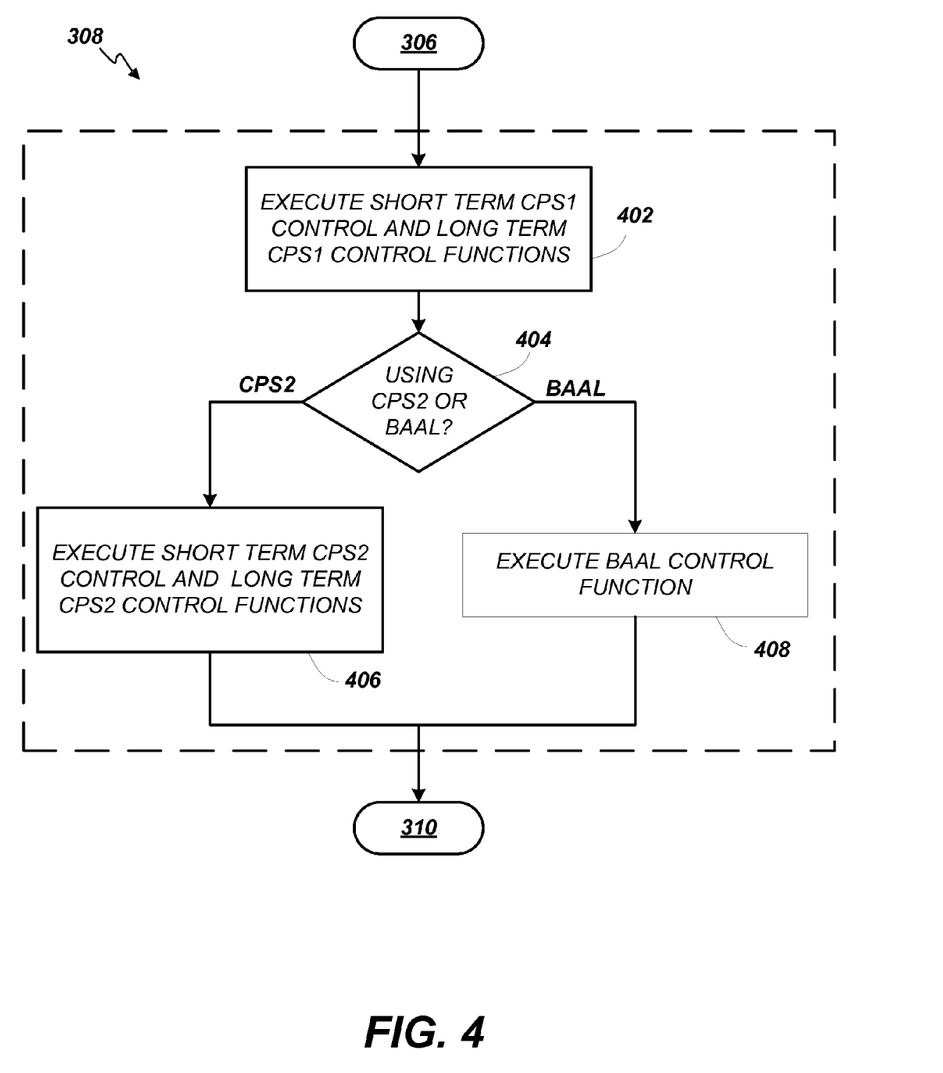
FIG. 4 is a flowchart depicting details of a portion of the example method of FIG. 3 according to embodiments of the present invention.

FIG. 4 depicts details of selecting the appropriate performance standards functions within the Coordinated CPS Control engine to execute while performing the above described method 300. In all cases, the Short Term CPS1 and Long Term CPS1 Control functions are executed (402). Flow proceeds based on the pre-selected performance standard being used, either CPS2 or BAAL (404). If CPS2 is in use, the Short Term CPS2 Control function is executed (406). IF BAAL is in use, the BAAL Control function is executed (408).

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A method of controlling an energy delivery system, the method comprising:
providing an energy management system (EMS) at an Independent System Operator (ISO) control center, the EMS having an automatic generation control (AGC) system including a load frequency control (LFC) module;
providing one or more communication paths between the AGC of the EMS and each one of one or more electrical power generating resources remote from the EMS;
executing two or more performance standard functions implemented within the LFC module using input data regarding the energy delivery system, wherein at least one of the performance standard functions is defined to be dependent upon another of the performance standard functions;
generating solution results based on executing the performance standard functions; and
transmitting instructions to implement corrections, based at least in part on the solution results, via the one or more communication paths to at least one of the one or more electrical power generating resources remote from the EMS.

2. The method of controlling an energy delivery system of claim 1, wherein the performance standard functions implemented within the LFC module include a Long Term North American Electric Reliability Corporation (NERC) Control Performance Standard 001 (CPS1) Control function, a Short Term CPS1 Control function, a Long Term NERC Control Performance Standard 002 (CPS2) Control function, and a Short Term CPS2 Control function, wherein Long Term refers to a time period of greater than a month and Short Term refers to a time period less than ten minutes.

3. The method of controlling an energy delivery system of claim 2, wherein the Long Term CPS1 Control function and the Long Term CPS2 Control function are integrated, and wherein the Short Term CPS1 Control function and the Short Term CPS2 Control are integrated.

4. The method of controlling an energy delivery system of claim 1, wherein the performance standard functions implemented within the LFC module include a Long Term CPS1 Control function, a Short Term CPS1 Control function, and a NERC Balancing Authority Area Control Error (ACE) Limit (BAAL) Control function, wherein Long Term refers to a time period of greater than a month and Short Term refers to a time period less than ten minutes.

5. The method of claim 4, wherein the BAAL Control function is operative to calculate a clock-minute ACE and a clock-minute BAAL, monitor a clock-minute ACE average, and initiate a control action to correct the ACE back to the clock-minute BAAL responsive to the ACE exceeding the clock-minute BAAL.

6. The method of controlling an energy delivery system of claim 1, wherein the input data includes historical data, static data, and dynamic data.

7. The method of controlling an energy delivery system of claim 1, wherein providing the LFC module includes providing an LFC application and a coordinated CPS control engine, and wherein the LFC application is operative to call the performance standard functions in the coordinated CPS control engine.

8. A system comprising:
a process controller;
one or more communication paths coupled between the process controller and one or more electrical power generating resources of an energy delivery system;
a memory coupled to the process controller and having instructions stored therein that, when executed by the process controller, cause the process controller to:
execute two or more performance standard functions using input data regarding an energy delivery system, wherein at least one of the performance standard functions is defined to be dependent upon another of the performance standard functions, to generate solution results; and
transmit one or more instructions to implement corrections via at least one of the one or more communication paths to at least one of the one or more electrical power generating resources of the energy delivery system;
wherein the one or more instructions are based, at least in part, on the solution results.

9. The system of claim 8, wherein the performance standard functions implemented within the LFC module include a Long Term CPS1 Control function, a Short Term CPS1 Control function, a Long Term CPS2 Control function, and a Short Term CPS2 Control function, wherein Long Term refers to a time period of greater than a month and Short Term refers to a time period less than ten minutes.

10. The system of claim 9, wherein the Long Term CPS1 Control function and the Long Term CPS2 Control function are integrated, and wherein the Short Term CPS1 Control function and the Short Term CPS2 Control function are integrated.

11. The system of claim 8, wherein the performance standard functions include a Long Term CPS1 Control function, a Short Term CPS1 Control function, and a BAAL Control function, wherein Long Term refers to a time period of greater than a month and Short Term refers to a time period less than ten minutes.

12. The system of claim 11, wherein the BAAL Control function is operative to calculate a clock-minute ACE and a clock-minute BAAL, monitor a clock-minute ACE average, and initiate a control action to correct an ACE back to the clock-minute BAAL responsive to the ACE exceeding the clock-minute BAAL.

13. The system of claim 8, wherein the input data includes historical data, static data, and dynamic data.

14. The system of claim 8, further comprising:
an LFC application and a coordinated CPS control engine, wherein the LFC application is operative to call the performance standard functions in the coordinated CPS control engine.

15. A system, comprising:
a load frequency control (LFC) application stored within the system that, when executed by a process controller, causes the process controller to generate an output data structure and to store solution results in an operational database of an energy management system (EMS);
a coordinated CPS control engine stored within the system that, when executed by the process controller, causes the process controller to receive input data, execute two or more performance standard functions called by the LFC application, and to populate the output data structure with solution results; and
one or more communication paths coupled between the process controller and one or more electrical power generating resources, the one or more communication paths configured to carry instructions from the process controller to at least one of the one or more electrical power generating resources to implement corrections;
wherein at least one of the performance standard functions executable by the coordinated CPS control engine is defined to be dependent upon another of the performance standard functions.

16. The system of claim 15, wherein the performance standard functions implemented within the coordinated CPS control engine include a Long Term CPS1 Control function, a Short Term CPS1 Control function, a Long Term CPS2 Control function, and a Short Term CPS2 Control function.

17. The system of claim 16, wherein the Long Term CPS1 Control function and the Long Term CPS2 Control function are integrated, and wherein the Short Term CPS1 Control function and the Short Term CPS2 Control function are integrated.

18. The system of claim 15, wherein the performance standard functions implemented within the system include a Long Term CPS1 Control function, a Short Term CPS1 Control function, and a BAAL Control function.

19. The system of claim 18, wherein the BAAL Control function is operative to calculate a clock-minute ACE and a clock-minute BAAL, monitor a clock-minute ACE average, and initiate a control action to correct an ACE back to the clock-minute BAAL responsive to the ACE exceeding the clock-minute BAAL.

20. The system of claim 15, wherein the system is communicatively coupled to a CPS database within a historical information system running on a second process controller.

* * * * *